Nov. 4, 1924.　　　　　　　　　　　　　　　　　　　　1,514,411
P. H. WILKINSON
HOSE CLAMP
Filed June 21, 1923
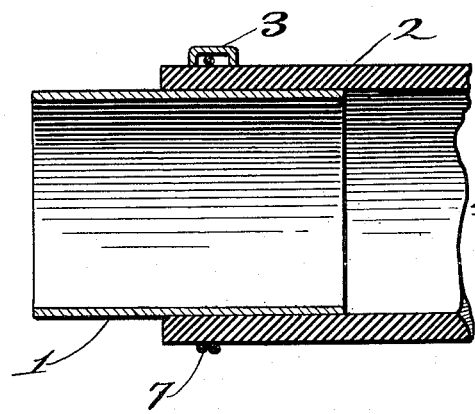
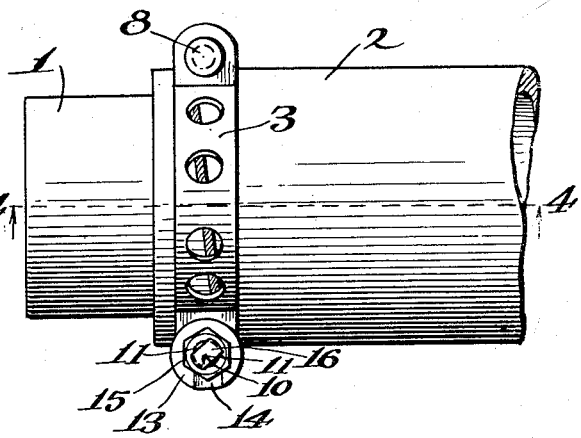
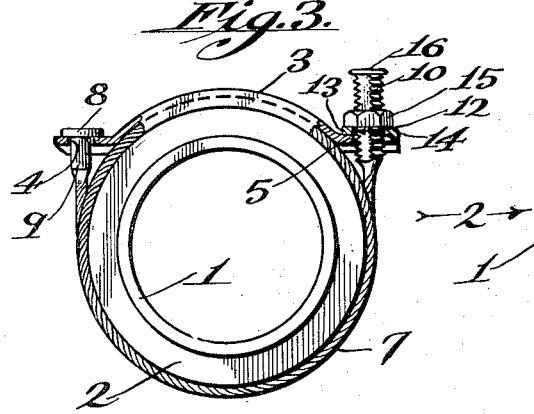
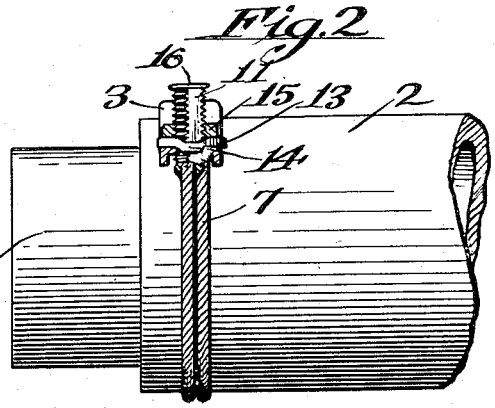
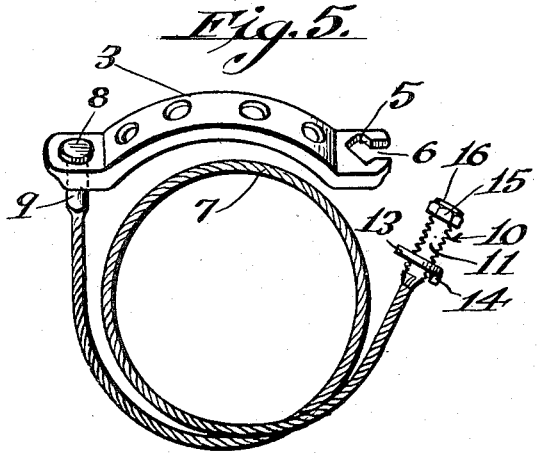
Inventor
P. H. Wilkinson
By Hazard and Miller
Attorneys
Witness.

Patented Nov. 4, 1924.

1,514,411

UNITED STATES PATENT OFFICE.

PAUL H. WILKINSON, OF LOS ANGELES, CALIFORNIA.

HOSE CLAMP.

Application filed June 21, 1923. Serial No. 646,797.

*To all whom it may concern:*

Be it known that I, PAUL H. WILKINSON, a citizen of the United States, residing at Los Angeles, in the county of Los Angeles and State of California, have invented new and useful Improvements in Hose Clamps, of which the following is a specification.

Although my present invention may be referred to as a hose clamp, it should be understood that this invention is of general applicability in securing any flexible or other tubular element to a cylindrical or similar body, such as a pipe or tube, of substantially rigid material.

In the present embodiment of my invention, which may be regarded as an improvement upon the invention claimed in my U. S. Patent No. 1,413,818, granted April 25, 1922, I employ, as before, a transverse yoke and a flexible cord or cable, or the like, and in the present case I employ a novel means for releasably connecting one end of said cable to said yoke.

As intimated, it is an object of the present invention to provide simple and effective means for securely connecting a central element, such as a pipe, with a concentric tubular element adapted to fit over the same, and, in a preferred embodiment of my invention, I may swivel one end of a cable to a yoke, and I may provide the free ends of the mentioned yoke and the mentioned cable with interfitting parts adapted to permit a hose, or the like, to be quickly connected or disconnected.

From one point of view, my invention may be regarded as comprising novel means for connecting one end of a cord or cable, or the like, with a slotted element, such as a yoke, a preferred embodiment for this purpose comprising a threaded member secured to said cable and provided with flattened surfaces, this threaded member being adapted to carry a washer provided with an aperture corresponding in configuration to the cross section of said threaded member, and provided also with an offset portion adapted to engage or interfit with an opening extending to a seat in said slotted member, in such manner as to cooperate with said nut in preventing a rotative movement of said threaded element during the tensioning of said cord or after said cord has been placed under tension by means of said nut.

Other objects of my invention will appear from the following description of a preferred embodiment thereof, and from the appended claims, taken in connection with the accompanying drawings, in which:

Figure 1 may be regarded as a top plan view showing my improved clamp as the same may be employed in securing a hose to a pipe, or the like.

Fig. 2 may be regarded as a side elevation of the parts shown in Figure 1.

Fig. 3 may be regarded as an end elevation, this view being taken in the direction indicated by the arrow 2, on Figure 1.

Fig. 4 may be regarded as a vertical section on line 4—4 of Figure 1.

Fig. 5 is a perspective view of my hose clamp, shown separately.

Fig. 6 shows a washer, hereinafter mentioned.

Referring in detail to the parts of that specific embodiment of my invention which I have chosen for purposes of illustration, 1 being a nipple or other tubular or substantially circular rigid element, and 2 being a hose or similar tubular element, whether flexible or inflexible, to be secured thereto, my improved clamp consists essentially of a yoke 3, which may be of the specific character shown in my mentioned patent, or of any other preferred design, except that this yoke is preferably provided with a circular aperture 4 at one end thereof, and with a non-circular opening, at the other end thereof, the latter preferably comprising an angular seat 5, adapted to receive the threaded portion of a locking device, hereinafter described, this locking device being movable into and out of its effective position through an opening 6, shown as extending lengthwise of said yoke.

My clamping cable 7 being of any usual or preferred construction, one end of this cable is preferably provided with a head 8, upon a circular body 9, extending through the opening 4 and thereby a rotatable or swivelling connection with a yoke 3; and, in order to permit my clamp to be quickly applied or removed, I prefer to employ a locking means comprising a threaded element 10, adapted to enter, by a lateral movement, through the opening 6 into the angular seat 5, in the free end of the yoke 3.

Although various equivalent quick-detachable locking means might be employed, I prefer to employ, for the purpose indicated, a threaded element 10, which may be tubular and suitably secured, as by soldering, to the cable 7, provided with substantially flat, lateral faces 11, the cross section of this threaded element 10 being such as to correspond approximately with the configuration of the angular seat 5, and such as to correspond more closely with the configuration of a perforation or aperture 12 in a washer 13, this washer being provided also with yoke-engaging means, which may have the character of an offset or depressed portion 14, adapted to enter the mentioned opening 6, through which the threaded element 10 is laterally movable, and to be depressed and secured in a locking engagement with both said threaded element and the angular seat 5 by means of a nut 15, which may be adapted to tension the cable 7, although it need not be removable over the free end of the threaded member 10.

From the foregoing description, it will be obvious that I have provided a novel and effective locking means operable without complete disconnection of the described parts; and that whether or not my threaded member 10 is provided with a head 16, upon the free end thereof, all of the mentioned parts are so secured together as to obviate liability to loss or displacement, and also by the interposition of the washer 13 between the nut 15 and the yoke 3, this washer being adapted to snap into the position shown in Figure 2 whenever the cable 7 is placed under tension by means of the nut 15, I have provided effective, although quickly releasable means, for locking all of the mentioned parts in their indicated relationships.

It will be understood that clamps embodying my invention may be made in a great variety of sizes and adapted to a great variety of uses, the said clamps being suitable for use in securing either flexible or non-flexible tubular elements upon either circular or non-circular nipples, or the like, the latter being either smooth or provided with circumferential corrugations, or the like, of any known or preferred character; my hose clamp being, moreover, of such simple construction as to be manufactured and sold at a moderate cost and suitable to be easily applied or removed.

Although I have herein described but one complete embodiment of my invention, it will be understood that various features thereof might be independently employed, and also that various modifications might be made therein without departure from the spirit and scope of my invention, as the same is indicated above and in the following claims.

What I claim is:

1. A clamp comprising a yoke and a cable, means for securing one end of the cable to one end of the yoke, a slot extending inwardly from the opposite end of the yoke, said slot terminating in an angular opening, the free end of the cable being provided with flat sides whereby it may slide through said slot and snugly engage the sides of said angular opening.

2. A clamp comprising a yoke and a cable, means for securing one end of the cable to one end of the yoke, a slot extending inwardly from the opposite end of the yoke, said slot terminating in an angular opening having more than three sides, the free end of the cable being provided with flat sides whereby it may slide through said slot and snugly engage the sides of said angular opening.

3. A clamp comprising a yoke and a cable, means for securing one end of the cable to one end of the yoke, a slot extending inwardly from the opposite end of the yoke, means permitting the free end of the cable to enter said slot, and a washer upon the free end of the cable having a portion adapted to engage said slot.

4. A clamp comprising a yoke and a cable, means for securing one end of the cable to one end of the yoke, a slot extending inwardly from the opposite end of the yoke and terminating in an opening having a plurality of straight sides which are neither perpendicular nor parallel to the sides of said slot, and means on the free end of the cable permitting it to be inserted through said slot and engage the sides of said opening.

5. A clamp comprising a yoke and a cable, means for securing one end of the cable to the yoke, a slot extending inwardly from the opposite end of the yoke and terminating in an opening, and means associated with the free end of the cable permitting it to be passed through the slot and into the opening, and allowing longitudinal movement in said opening but preventing rotation therein.

6. A clamp comprising a yoke and a cable, means for securing one end of the cable to the yoke, comprising a tubular member engaging the cable, and a flattened head integral with said tubular member adapted to bear against a portion of the yoke.

7. A clamp comprising a yoke and a cable, means for securing one end of said cable to one end of said yoke, a slot extending inwardly from the opposite end of the yoke, and means associated with the free end of the cable permitting it to enter said slot but preventing rotation therein.

In testimony whereof I have signed my name to this specification.

PAUL H. WILKINSON.